US010410422B2

(12) United States Patent
Rochford et al.

(10) Patent No.: US 10,410,422 B2
(45) Date of Patent: Sep. 10, 2019

(54) SYSTEM AND METHOD FOR AUGMENTED REALITY CONTROL

(71) Applicant: Samsung Electronics Co., Ltd, Suwon-si (KR)

(72) Inventors: Ciaran Rochford, Bellevue, WA (US); Philippe Harscoet, Bellevue, WA (US); Xiaoguang Li, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/402,065

(22) Filed: Jan. 9, 2017

(65) Prior Publication Data

US 2018/0197336 A1  Jul. 12, 2018

(51) Int. Cl.
*G06F 3/12* (2006.01)
*G06T 19/00* (2011.01)
*G06F 3/01* (2006.01)
*G02B 27/01* (2006.01)
*G06F 3/0481* (2013.01)

(52) U.S. Cl.
CPC ........ *G06T 19/006* (2013.01); *G02B 27/0172* (2013.01); *G06F 3/012* (2013.01); *G06F 3/013* (2013.01); *G06F 3/0481* (2013.01); *G06F 3/04815* (2013.01); *G02B 2027/014* (2013.01); *G02B 2027/0138* (2013.01); *G02B 2027/0141* (2013.01); *G02B 2027/0178* (2013.01); *G06F 2203/04809* (2013.01)

(58) Field of Classification Search
CPC ..................................................... G06F 3/013
USPC ........................................................ 345/633
See application file for complete search history.

(56) References Cited

U.S. PATENT DOCUMENTS

| 8,643,569 B2 | 2/2014 | Vesely |
| 9,201,568 B2 | 12/2015 | Chavez et al. |
| 2012/0120070 A1* | 5/2012 | Baillot ............ G08B 13/19621 345/419 |
| 2013/0281207 A1 | 10/2013 | Lyons et al. |
| 2014/0139453 A1* | 5/2014 | Yu ........................... G06F 3/011 345/173 |
| 2015/0097862 A1 | 4/2015 | Reisner-Kollmann et al. |
| 2015/0193980 A1 | 7/2015 | Pedley et al. |

(Continued)

FOREIGN PATENT DOCUMENTS

| KR | 10-2011-0107542 A | 10/2011 |
| KR | 10-2016-0068837 A | 6/2016 |

OTHER PUBLICATIONS

ISA/KR, "International Search Report and Written Opinion of the International Search Authority," International Application No. PCT/KR2018/000433, dated Apr. 13, 2018, 16 pages.

*Primary Examiner* — Thomas J Lett

(57) ABSTRACT

A head mounted device (HMD), method, and computer readable medium for control of AR content to create a sensation that virtual objects are real. The HMD includes a camera, a display, a memory and a processor. The processor is coupled to the memory, the display, and the camera. The processor is configured to identify a physical object in the image data as a marker object. The processor is further configured to display an overlay on the marker object on the display. The processor is further configured to track motion of the marker object. The processor is also configured to adjust the overlay on the display based on the motion of the marker object.

30 Claims, 12 Drawing Sheets

(56) References Cited

U.S. PATENT DOCUMENTS

2015/0193982 A1 7/2015 Mihelich et al.
2015/0302664 A1 10/2015 Miller
2017/0113056 A1* 4/2017 Stocco .................. A61N 2/006

* cited by examiner

SYSTEM AND METHOD FOR AUGMENTED REALITY CONTROL

TECHNICAL FIELD

This disclosure relates generally to augmented reality. More specifically, an embodiment relates to a method and apparatus for providing an overlay on a physical object.

BACKGROUND

Augmented reality (AR) provides content to enhance an experience in a real world setting. AR displays content on a screen or lens that corresponds to the surroundings being viewed by a user, but does not exist as a physical embodiment outside of a display. Because the AR content does not exist in the physical world, interacting with AR content is difficult.

SUMMARY

This disclosure provides a method and apparatus for control of AR content to create a sensation that virtual objects are real.

In a first embodiment, a head mounted device (HMD) is provided for control of AR content to create a sensation that virtual objects are real. The HMD includes a camera, a screen, a memory and a processor. The processor is coupled to the memory, the screen, and the camera. The processor is configured to identify a physical object in the image data as a marker object. The processor is further configured to display an overlay on the marker object on the screen. The processor is further configured to track motion of the marker object. The processor is also configured to adjust the overlay on the screen based on the motion of the marker object.

In a second embodiment, a method is provided for control of AR content to create a sensation that virtual objects are real. The method includes identifying a physical object in the image data as a marker object. The method further includes displaying an overlay on the marker object on the screen. The method further includes tracking motion of the marker object. The method further includes adjusting the overlay on the screen based on the motion of the marker object.

In a third embodiment, a non-transitory medium embodying a computer program is provided for control of AR content to create a sensation that virtual objects are real. The program code, when executed by at least one processor, causes a processor to identify a physical object in the image data as a marker object. The program code, when executed by at least one processor, further causes a processor to display an overlay on the marker object on the screen. The program code, when executed by at least one processor, further causes a processor to track motion of the marker object. The program code, when executed by at least one processor, further causes a processor to adjust the overlay on the screen based on the motion of the marker object.

In a fourth embodiment, a head mounted device (HMD) is provided for gaze detection. The HMD includes a camera, a screen, a memory and a processor. The processor is coupled to the memory, the screen, and the camera. The processor is configured to determine an orientation of each eye of a user wearing the HMD. The processor is further configured to identify a focus point on a marker object based on a combination of the orientation of each eye. The processor is further configured to track the focus point on the marker object. The processor is also configured to display information that relates to content at the identified focus point on the screen of the HMD.

Other technical features may be readily apparent to one skilled in the art from the following FIGS., descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 18, discussed below, and the an embodiment used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
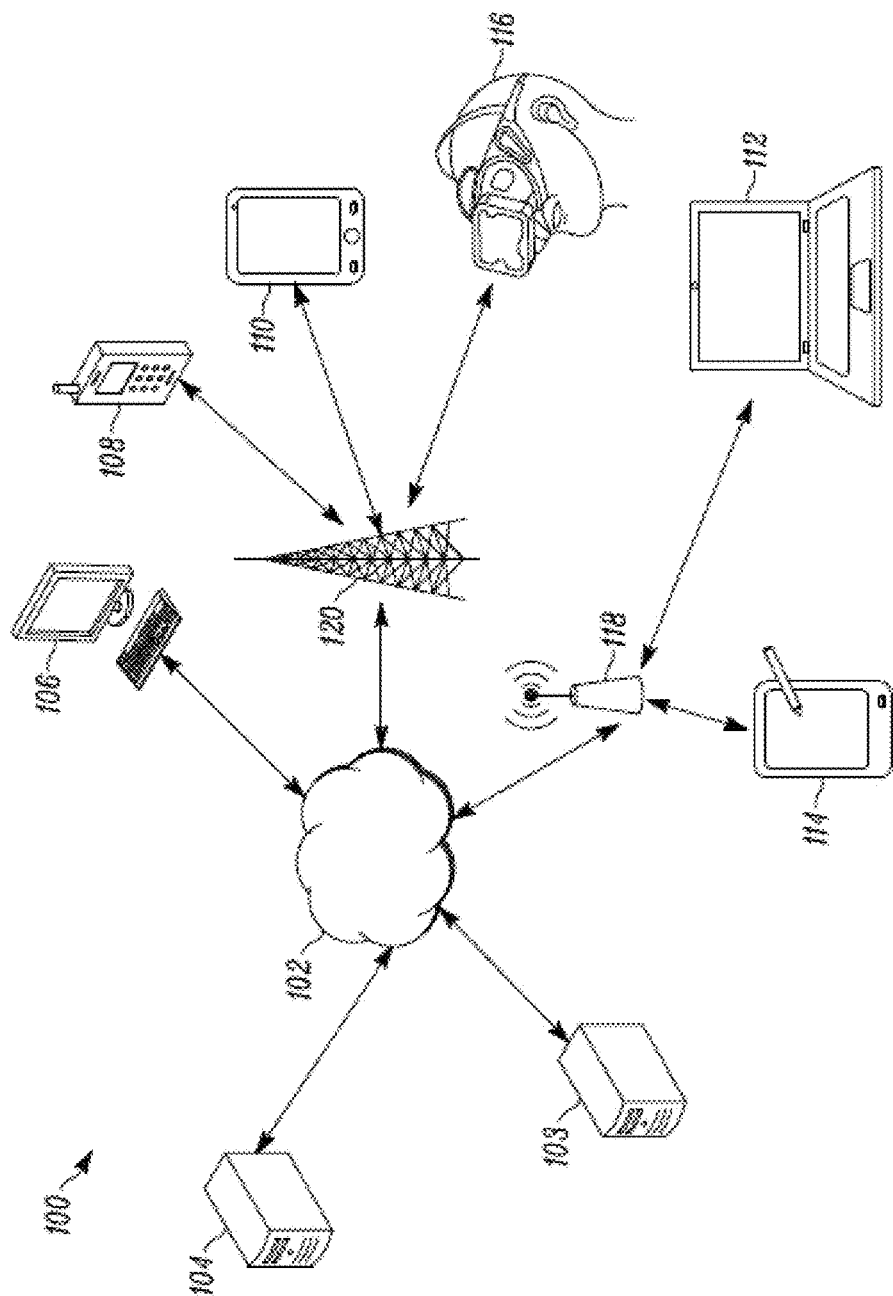
FIG. 1 illustrates an example communication system according to an embodiment of the present disclosure.

FIG. 1 illustrates an example communication system 100 in which an embodiment of the present disclosure may be implemented. The embodiment of the communication system 100 shown in FIG. 1 is for illustration only. Other embodiments of the communication system 100 may be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various electronic devices 106-116. Each server 104 includes any suitable computing or processing device that can provide computing services for one or more electronic devices. Each server 104 may, for example, include one or more processors, one or more memories storing instructions and data, and one or more network interfaces facilitating communication over the network 102.

Each electronic device 106-116 represents any suitable computing or communication device that interacts with at least one server or other computing device(s) over the network 102. In this example, the electronic devices 106-116 include electronic devices, such as, for example, a desktop computer 106, a mobile telephones or smartphones 108, a personal digital assistant (PDA) 110, a laptop computer 112, a tablet computer 114, a headset 116, a wearable device, smart watch, etc. However, any other or additional electronic devices may be used in the communication system 100.

In this example, some electronic devices 108-116 communicate indirectly with the network 102. For example, the electronic devices 108-110 and 116 communicate via one or more base stations 120, such as cellular base stations or eNodeBs. Also, the electronic devices 112-114 communicate via one or more wireless access points (APs) 118, such as IEEE 802.11 wireless APs, Bluetooth, and WiFi direct. Note that these are for illustration only and that each electronic device may communicate directly with the network 102 or indirectly with the network 102 via any suitable intermediate device(s) or network(s).

As described in more detail below, when the electronic device 116 is operating an AR program that uses an overlay on a physical object, the server 103 transmits supplemental information to the electronic device 116 for display on or with the overlay. Also, data of or from a marker object of electronic device 110 can be transmitted to electronic device 116 for both users to experience the same overlay on a single physical object. The electronic device 116 is responsible for tracking marker objects in a three dimensional (3D) space. Overlays are tracked to marker objects using computer vision (CV) and/or by using the data sent by the marker objects themselves. The electronic device 116 includes hardware to enable tracking, such as stereo red green blue and infrared (RGBIR) cameras built into the headset. The electronic device 116 creates a model into VR or AR space that represents the marker object in order for the marker object to be skinned with the VR or AR content. The electronic device 116 is responsible for tracking all user input associated with the skinned marker object, processing it and updating the headsets view (including the skin) in real time. For example, the user taps on a part of the marker object or the headset can communicate wirelessly with marker objects with wireless communication capabilities.

Although FIG. 1 illustrates one example of a communication system 100, various changes may be made to FIG. 1. For example, the system 100 may include any number of each component in any suitable arrangement. In general, computing and communication systems come in a wide variety of configurations, and FIG. 1 does not limit the scope of this disclosure to any particular configuration. While FIG.

1 illustrates one operational environment in which various features disclosed in this patent document can be used, these features may be used in any other suitable system.

Figure 2:
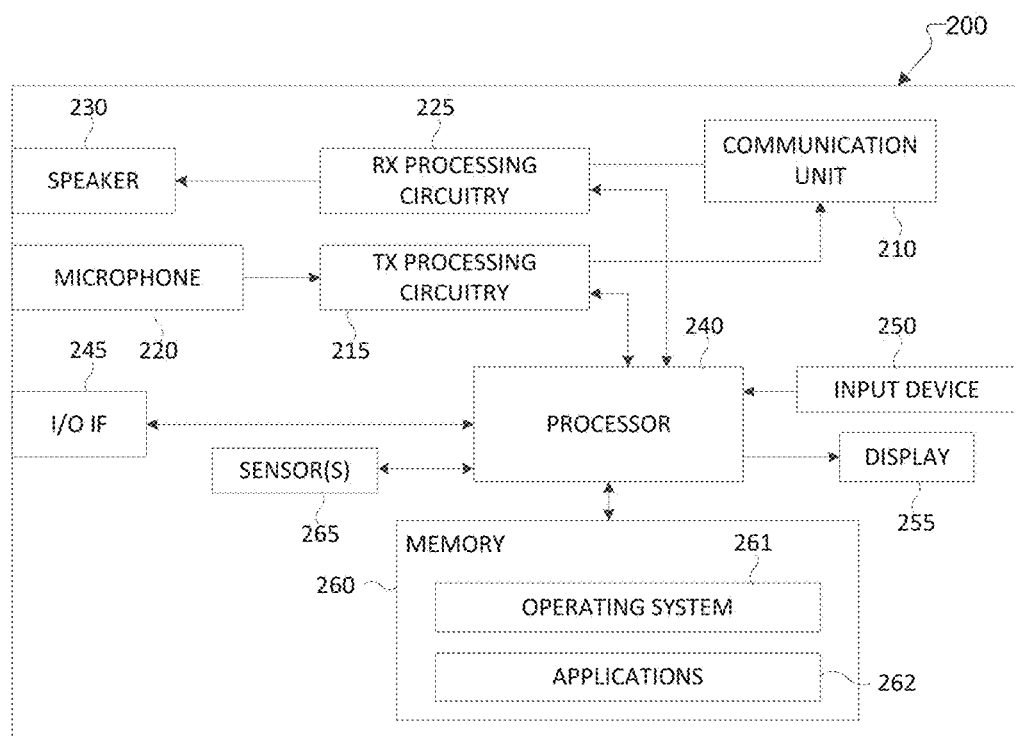
FIG. 2 illustrates an example electronic device according to an embodiment of the present disclosure.

FIG. 2 illustrates an example electronic device 116 in a communication system according to an embodiment of the present disclosure. The electronic device 116 may represent one or more of the electronic devices 106-116 in FIG. 1.

As shown in FIG. 2, the electronic device 116 includes a communication unit 210, transmit (TX) processing circuitry 215, a microphone 220, and receive (RX) processing circuitry 225. The communication unit 210 may include, for example, a RF transceiver, a Bluetooth transceiver, or a Wi-Fi transceiver. The electronic device 116 also includes a speaker 230, a processor 240, an input/output (I/O) interface (IF) 245, an input device 250, a display 255, and a memory 260. The memory 260 includes an operating system (OS) program 261 and one or more applications 262.

The communication unit 210 may receive an incoming RF signal such as a Bluetooth signal or a Wi-Fi signal. The communication unit 210 may down-convert the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The communication unit 210 may receive the outgoing processed baseband or IF signal from the TX processing circuitry 215 and up-converts the baseband or IF signal to an RF signal that is transmitted via the antenna 205.

The processor 240 can include one or more processors and execute the OS program 261 stored in the memory 260 in order to control the overall operation of the electronic device 200. For example, the processor 240 may control the reception of forward channel signals and the transmission of reverse channel signals by the communication unit 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from external devices or an operator. The processor 240 can execute an application 263 for operating an AR environment and marker objects.

The processor 240 is also coupled to the I/O interface 245, which provides the electronic device 200 with the ability to connect to other devices such as laptop computers, handheld computers and other accessories, for example, a VR headset. The I/O interface 245 is the communication path between these accessories and the processor 240. The processor 240 can recognize accessories that are attached through the I/O interface 245, such as a VR headset connected to a USB port.

The processor 240 is also coupled to the input 250 and the input device 255. The operator of the electronic device 200 can use the input device 250 (e.g., keypad, touchscreen, button etc.) to enter data into the electronic device 200. The display 255 may be a liquid crystal display, a light-emitting diode (LED) display, an optical LED (OLED), an active matrix OLED (AMOLED), or other display capable of rendering text and/or at least limited graphics, such as from web sites. Display in the context of this application can refer to a display on an electronic device or a transparent lens capable of displaying images on the lens. For example, a display can exist in a pair of glasses frame as the lenses.

The memory 260 is coupled to the processor 240. Part of the memory 260 may include a random access memory (RAM), and another part of the memory 260 may include a flash memory or other read-only memory (ROM).

Electronic device 116 further includes one or more sensors 265 that can meter a physical quantity or detect an activation state of the electronic device 116 and convert metered or detected information into an electrical signal. For example, sensor 265 may include one or more buttons for touch input, e.g., on the headset or the electronic device 116, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 265 can further include a control circuit for controlling at least one of the sensors included therein. The electronic device 116 can be used as a head mounted device (HMD). Any of these sensor(s) 265 may be located within the electronic device 116, within a headset configured to hold the electronic device 116, or in both the headset and electronic device 116, for example, in embodiments where the electronic device 116 includes a headset.

As described in more detail below, when the electronic device 116 is operating an AR application, the electronic device 116 displays an overlay on a display that appears to be a "skin" of a physical object or a "projection" from a physical object chosen a marker object.

Although FIG. 2 illustrates an example of an electronic device in a communication system, various changes may be made to FIG. 2. For example, various components in FIG. 2 may be combined, further subdivided, or omitted and additional components may be added according to particular needs. As a particular example, the processor 240 may be divided into multiple processors, such as one or more central processing units (CPUs) and one or more graphics processing units (GPUs). Also, while FIG. 2 illustrates the electronic device 200 configured as a mobile telephone or smartphone, electronic devices may be configured to operate as other types of mobile or stationary devices. In addition, as with computing and communication networks, electronic devices can come in a wide variety of configurations and FIG. 2 does not limit this disclosure to any particular electronic device.

Figure 3A:
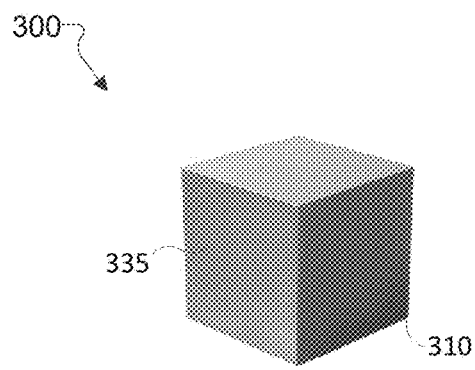
FIGS. 3A and 3B illustrate an example marker object according to an embodiment of the present disclosure.
Figure 3B:
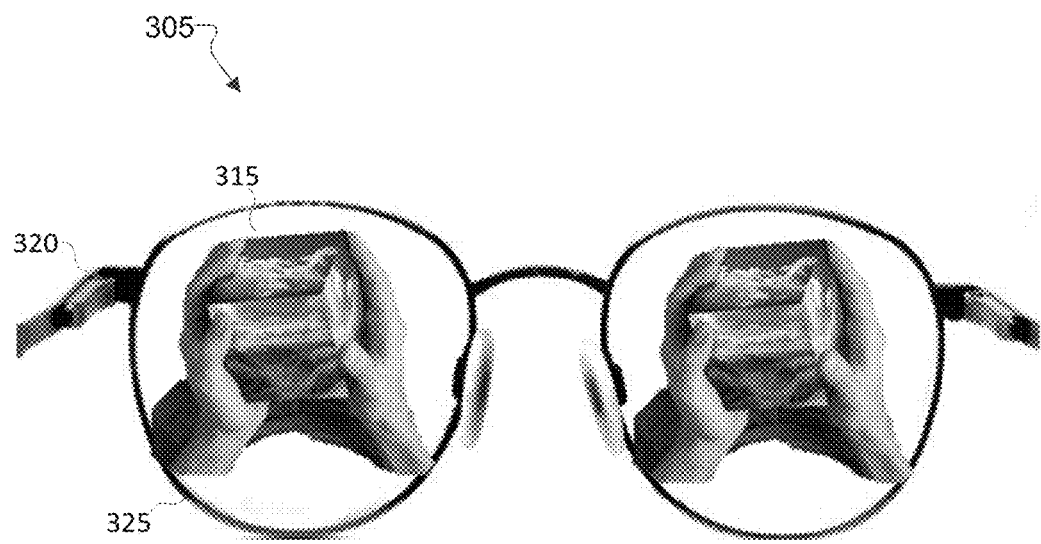

FIGS. 3A and 3B illustrate an example marker object 300 according to an embodiment of this disclosure. FIG. 3A illustrates a physical object 310 and FIG. 3B illustrates an AR environment 305 with an overlay 315 on the marker object 300 viewed by an AR device 320 with a display 235 as each transparent lens 325. The embodiment of the marker object 300 and the AR environment 305 shown in FIGS. 3A and 3B are for illustration only. Other embodiments of the marker object 300 may be used without departing from the scope of this disclosure. Both the AR device 320 and the marker object 300 can be implemented as an electronic device 200 illustrated in FIG. 2.

The physical object 310 is illustrated as a cube, but may be any type of regular or irregular shape. The physical object 310 can be selected as a marker object 300. In the AR environment 305, one or more marker objects 300 can be selected. The selection of which specific physical objects 310 can be determined by a user or configured by application 262. For example, application 262 may be a sports related application and recognizing a spherical shaped physical object 310 may automatically create an overlay 315 for a ball for a sport. The application 262 may also recognize a user's hand (fingerprint, outline, etc.) or a specific gesture with one or both hands (holding with both hands, hold with one hand and tap with a second hand, etc.). A specialized marker object (discussed later in relation to FIG. 9) may automatically be selected as a marker object 300 upon a trigger, such as connecting wirelessly, powering on, receiving an input (e.g. button, switch, touch sensor, etc.) on the physical object 310. The marker object 300 may also be selected based on an input on the AR device 320. Different size and shaped physical objects 310 may allow for different uses of the marker objects 300.

The overlay 315 is displayed on the display 325 to appear as a skin on the physical object 310. The different types of overlays 315 are discussed in greater detail below. When the marker object 300 leaves the view of the AR environment 305 of the display 325, the application can remove the physical object 310 as a marker object 300 or choose to remain selected. The decision can be made by a user in advance or through a hand gesture for clearing the marker objects 300. Separate non-limiting examples of functions corresponding to gestures may include clearing a marker object 300, clearing all marker objects 300, clearing marker object 300 out of the AR environment 305, or any other clearing function. More non-limiting examples of functions corresponding to gestures are provided throughout the Specification.

Marker object 300 specific gestures include, for example, a "pouring" gesture, a "connect" gesture, an "invert and shaking out" gesture, a "peeling" gesture, and a "drag" gesture. The following examples are non-limiting functions that are performed when a gesture or motion of the marker object is performed in relation to a second marker object. The "pouring" gesture is used to transfer virtual content from a first marker object 300 to a second marker object 300. The "connect" gesture is used to put together two marker objects 300 to exchange their configuration and content status. The "invert and shaking out" gesture is used to remove virtual content from a marker object 300. The "peeling" gesture is used to move foreground content to the background. The "drag" gesture may highlight a marker object 300 and allow a user to move the virtual content to another compatible marker object 300.

In some embodiments, the marker object remains connected to the AR device 320 when out of view of the AR environment 305. When the surfaces 310 of the marker object 300 are defined to specific application or functions, the sensors on the physical object 310 can be used to control other AR content. For example, if the surfaces 335 of the physical object 310 represent controls for a television, the user may still be able to use the controls out of the view of the AR environment 305.

The overlay 315 can be programmed to cover all surfaces 335 of a marker object 300 or specific surfaces 335. As with the gesture corresponding to functions for selecting and removing marker objects 300, other gestures may be design to select and remove specific surfaces 335 of marker objects 300. The overlay 315 may also be used to display controls for interacting with other objects in the AR environment or as a controller for other physical objects. For example, the overlay 315 may display the functions of a remote controller in order to control a television in the room or the overlay 315 may display a keyboard on a surface for use with a computer or a second marker object 300 that contains an overlay 315 with an application with text input.

Some examples of uses for marker objects 300 includes gaming applications, real world virtual objects, real world object replacement, and more virtual content between marker objects 300. For gaming applications, the marker objects are enabled to act as controllers for content, taking the users input and having a virtual window show the result of the input. For example, the user may role the marker objects 300 with dots projected on them to act as dice. The dice rolls may be used in a gaming application currently running in the AR environment 305.

For real world virtual objects, the marker objects 300 enable the AR environment 305 to place virtual icons and apps on the marker objects 300. The virtual icons and apps on marker objects 300 may provide quick physical access to apps and controls, improving the user input experience through simplification and reliability of the new overlay 315.

For real world object replacement, the marker object 300 enables replacing common accessory objects as needed. The marker objects 300 may change AR content whenever needed. For example, the AR content may make a static physical picture frame dynamic, replace a calculator, phone, radio, keyboard, etc.

For moving virtual content between marker objects, the marker object 300 enables a marker object 300 to move/copy its virtual content to other compatible marker objects 300. For example, tilting the first marker object 300 to tap a second marker object 300 may indicate the use of a pouring animation allowing the AR content to be transferred from the first marker object 300 to the second marker object 300. A primary marker object, such as a stylus or other tool, may be used for certain functions. For example, the stylus may have a plurality of functions including selecting, marking, etc. For example, the stylus may be used to select and lift or copy an overlay from a first marker object to place on a second marker object. In another example, the stylus may be programmed to act as a paintbrush tool for drawing on a second marker object 300.

Certain physical object 310, like electronic device 200, includes different inputs, such as switch, keys, touch panels, etc. The physical object 310 may include a communication unit 210 may be used to wirelessly connect with AR device 320 to identify its status as a marker object 300. The physical object 310 includes input devices 250, such as touchscreens, for detecting a user's input. In some embodiments, the AR device 320 has capability to determine users input through an input on the physical device 310, detecting a gesture in the image data of a camera sensor 265, or a combination of both the input on the physical device and a gesture detected in the image data of the camera sensor 265 and determining a function corresponding to the input or gesture. Other sensors can also be incorporated into the physical object 310 of the marker object 300 such as haptic support to enable physical feedback to the user and cool or heat emitters. The marker objects 300 include a set of attributes that may broadcast to the AR device 320, other AR devices 320, and other marker objects 300. The broadcast may allow the capabilities and AR content to be understood or shared. The capabilities and AR content may also be programmed into the marker object in this manner. Some attributes include, for example, supported gestures and hardware. Example of hardware attributes includes exterior dimensions, contours, displays, touch support, sensor, etc. Examples of supported gestures include rotate, movement, taping, etc.

Although FIGS. 3A and 3B illustrate one example of a marker object 300, various changes may be made to FIGS. 3A and 3B. For example, various components in FIGS. 3A and 3B may be combined, further subdivided, or omitted and additional components may be added according to particular needs. As a particular example, while FIGS. 3A and 3B illustrate the marker object 300 configured as a box, but marker objects may be configured to operate as other types of regular or irregular shapes. Also for example, the AR environment 305 in FIG. 3B illustrates the AR device 320 as a pair of glass, but the AR device 320 may be a mobile device, AR headset, etc.

Figure 4:
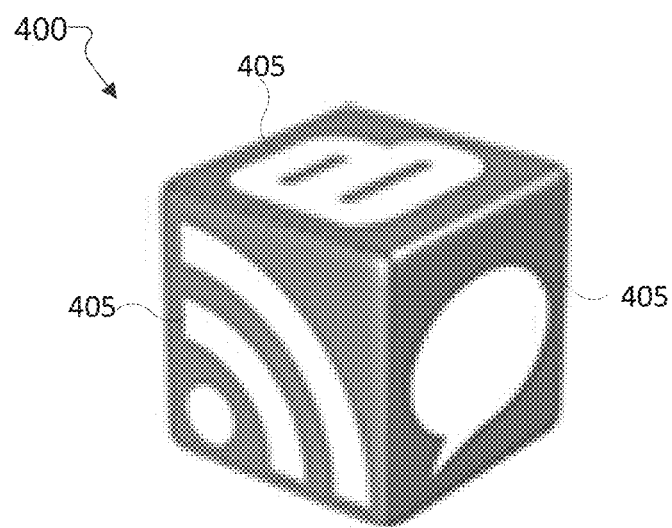
FIG. 4 illustrates an example overlay on a marker object according to an embodiment of the present disclosure.

FIG. 4 illustrates an example overlay 400 on a marker object 300 according to an embodiment of this disclosure. The embodiment of the overlay 400 shown in FIG. 4 is for illustration only. Other embodiments of the overlay 400 may be used without departing from the scope of this disclosure.

A different surface overlay 405 can be produced on each surface 335 of the marker object 300. The surface overlays 405 can be an image, video, application icon, or any other type of AR content for display on the marker object 300. The surface overlays 405 can be further divided into multiple AR content on each surface overlay 405.

Rotating the marker object 300 direct will adjust the surface overlays 405 to display different AR content. The marker object 300 can be programmed to have each surface 335 represent a specific surface overlay 405 or the surface overlays 405 may appear based on priority of the AR content. If the specific surfaces 335 do not correspond to specific surface overlays 405, then an unlimited amount of AR content may be displayed as a surface overlay 405.

When the surface overlay 405 represents an application, a gesture may be performed to activate a function or application related to the surface overlay 405. For example, double tapping the surface overlay 405 of a chat icon may cause a text conversation to appear in relation to the marker object 300. The text conversation, once selected, may appear on the surface overlay 405 that previously displayed the chat icon or all the surface overlays 405 may open different text conversations. Rotating the marker object 300 while all the surface overlays 405 are displayed may cause the appearing surface overlay 405 to show the next text conversation in order of priority, such as by conversations by most recent message received, or conversations by most recent message sent, etc.

Although FIG. 4 illustrates one example of overlay 400, various changes may be made to FIG. 4. For example, various components in FIG. 4 may be combined, further subdivided, or omitted and additional components may be added according to particular needs. As a particular example, while FIG. 4 illustrates the overlay 400 configured as icons on a marker object 300, overlays 400 may be configured to display any type of information or content.

Figure 5:
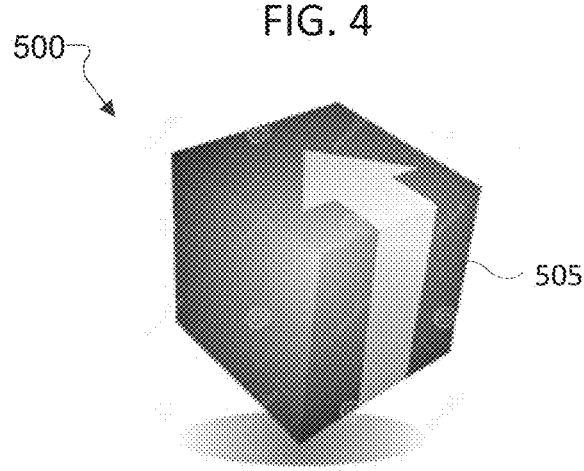
FIG. 5 illustrates an example non-static overlay according to an embodiment of the present disclosure.

FIG. 5 illustrates an example non-static overlay 500 according to an embodiment of this disclosure. The embodiment of the non-static overlay 500 shown in FIG. 5 is for illustration only. Other embodiments of the non-static overlay 500 may be used without departing from the scope of this disclosure.

The marker object 300 may have non-static overlays 505. The non-static overlays 505 may display animations, motions (such as rippling effects), videos, etc. The non-static overlays 505 may transition from one surface 335 to another surface 335. For example, FIG. 5 illustrates an arrow extending from the front, right surface to the top surface. The animation of the arrows may begin by moving from the bottom of the marker object 300 across the front, right surface to the top surface and off the marker object 300 from the top surface.

Gestures to the marker object 300 may cause the AR content on the non-static overlays 505 to rotate off the marker object and display new AR content. For example, a spherical marker object 300 may display a globe of earth and rotating the marker object may cause the world on the non-static overlay 505 to turn respective to the rotation.

Although FIG. 5 illustrates one example of non-static overlay 500, various changes may be made to FIG. 5. For example, various components in FIG. 5 may be combined, further subdivided, or omitted and additional components may be added according to particular needs. As a particular example, while FIG. 5 illustrates the non-static overlay 500 configured as an arrow across multiple surfaces of the overlay, non-static overlay 500 may be configured to operate as any type of animation or moving overlay.

Figure 6:
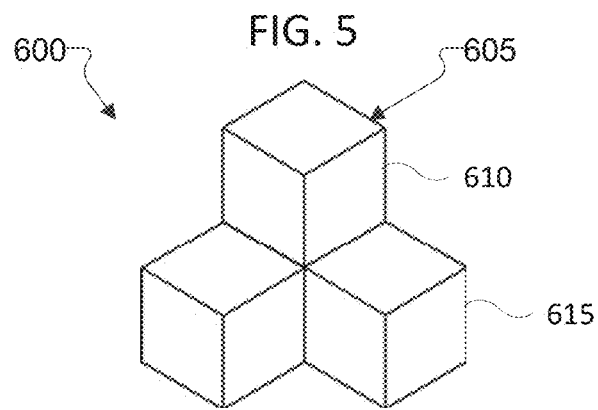
FIG. 6 illustrates an example interaction of multiple marker objects according to an embodiment of the present disclosure.

FIG. 6 illustrates an example interaction 600 of multiple marker objects 300 according to an embodiment of this disclosure. The embodiment of the interaction 600 shown in FIG. 6 is for illustration only. Other embodiments of the interaction 600 may be used without departing from the scope of this disclosure.

When multiple marker objects 300 are displayed in the AR environment 305, the marker objects 300 have the ability to interact with other marker objects 300. The marker objects 300 may work independently or together. For example, marker objects 300 placed side-by-side can act as one larger marker object 605. In placing the first marker object 610 in proximity to the second marker object 615 could virtually bond the two objects, even when the physical objects are not bound together. The proximity of the first object marker 610 to the second marker object 615 may indicate different functionalities or content to be displayed.

For example in a home entertainment AR environment, a first marker object 610 placed on top of the second marker object 615 could produce a remote for a television, turn on or switch input on a television for watching a show. When the first marker object 610 is placed to the side of the second marker object 615, the combined marker objects produce a gaming remote and turn on a gaming system or switch an input of a television for playing a game.

In certain embodiments, the marker objects 300 may contain magnets electromagnets, or other mechanisms to allow the marker objects 300 to connect or fasten to each other in order to connect seamlessly when needed. Marker objects can also transfer "virtual app content" from a first marker object 610 to a second marker object 615. When the marker objects are combined, the overlay may display on the outer visible surfaces.

Although FIG. 6 illustrates one example of interaction 600, various changes may be made to FIG. 6. For example, various components in FIG. 6 may be combined, further subdivided, or omitted and additional components may be added according to particular needs. As a particular example, while FIG. 6 illustrates the interaction 600 is configured as a plurality of marker objects 300 in a pyramidal shape, interaction 600 between the marker objects 300 may be configured to interact in any way.

Figure 7A:
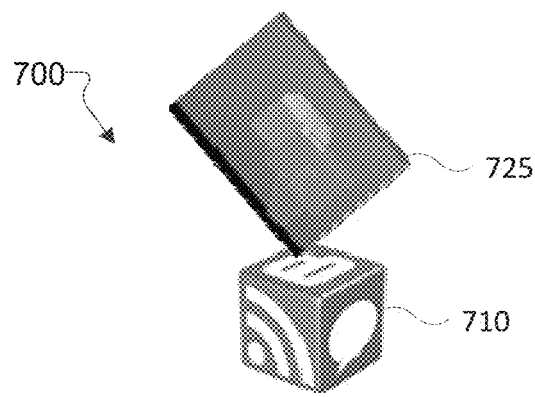
FIGS. 7A and 7B illustrate example projections from a marker object according to an embodiment of the present disclosure.
Figure 7B:
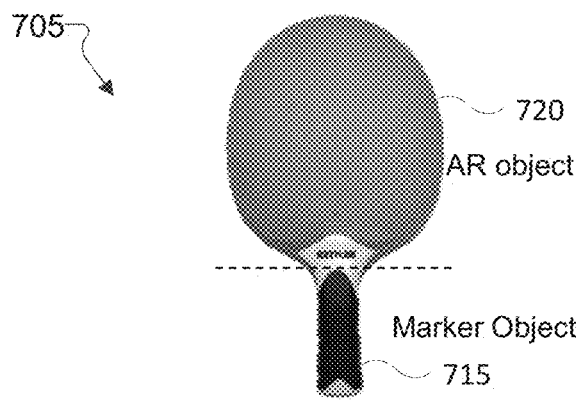

FIGS. 7A and 7B illustrate example projections 700 and 705 from a marker object 300 according to an embodiment of this disclosure. The embodiment of the wireless example projections 700 and 705 shown in FIGS. 7A and 7B is for illustration only. Other embodiments of the example projections 700 and 705 may be used without departing from the scope of this disclosure. FIG. 7A illustrates a marker object 300 as an anchor 710 and FIG. 7B illustrates a marker object 300 as a physical component 715 or a virtual component 720.

A marker object 300 can be used as an anchor 710 for an associated virtual window 725. The marker object 300 can also have an associated virtual window 725 in the AR environment 305 anchored to a surface overlay 405. The virtual window 725 allows for multiple applications to be operating off a single marker object 300. For example, while the virtual window 725 is displayed, the AR device 320 receiving a text may cause the text to display on the chat surface overlay 405.

A projection 705 as a virtual component 720 may be integrated into a physical component 715. The AR environment 305 may appear to have a single object comprising both the physical component 715 and the virtual component. For example, a ping pong paddle is illustrated in FIG. 7B. The handle of the ping pong paddle may be the physical component 715, such as a cylinder shaped object, and the paddle surface may be the virtual component 720, but the overall ping pong paddle appears to be a single fluid piece. The user can hold and move the physical component 715 and the virtual component will function as if a physical part of the marker object 300. For example, for a whip, the physical component 715 may be any rod shaped object for the handle and the virtual component may by a length of virtual cord that may experience vibrations and wave motion as the user performs a whipping motion with the physical component 715.

In some embodiment, the physical component 715 and the virtual component 720 affect each other. For example, physical inputs on the marker object 300 can be used to manipulate the virtual component 720, such as changing a size or type of the paddle. The virtual component 720 may cause the physical component 715 to experience feedback, such as haptic feedback when the paddle hits a virtual ping pong ball.

Although FIGS. 7A and 7B illustrate one example of example projections 700 and 705, various changes may be made to FIGS. 7A and 7B. For example, various components in FIGS. 7A and 7B may be combined, further subdivided, or omitted and additional components may be added according to particular needs. As a particular example, while FIGS. 7A and 7B illustrates the example projections 700 and 705 configured as an object projecting off a surface of the marker object, projections 700 and 705 may be configured to operate as other types of projections.

Figure 8:
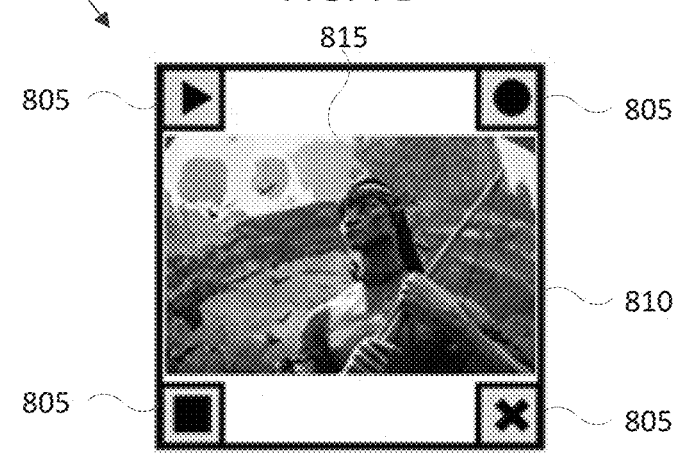
FIG. 8 illustrates an example multiple marker objects delineating a boundary according to an embodiment of the present disclosure.

FIG. 8 illustrates an example multiple marker objects 300 delineating a boundary 800 according to an embodiment of this disclosure. The embodiment of the marker objects 300 defining a boundary 800 shown in FIG. 8 is for illustration only. Other embodiments of the marker objects 300 defining a boundary 800 may be used without departing from the scope of this disclosure.

The border marker objects 805 define a boundary 810 for AR content 815. The border marker objects 805 can each be a physical object 310, like a cube, or can be locations on physical object 310. For example, the user makes a gesture marking a location on a physical object or a marker object 300 to indicate a border marker object 805. The border marker objects 850 can be used as corners or outside borders for other shapes, such as irregular shapes or ovals. The border marker objects 805 may be used as controls for the AR content 815. When the AR content 815 is a video, the border marker objects 805 may include control for playing the video, stopping the video, opening a menu, or exiting the video, etc.

Although FIG. 8 illustrates one example of marker objects 300 defining a boundary 800, various changes may be made to FIG. 8. For example, various components in FIG. 8 may be combined, further subdivided, or omitted and additional components may be added according to particular needs. As a particular example, while FIG. 8 illustrates the marker objects 300 defining a boundary 800 configured as a mobile telephone or smartphone, boundaries may be configured to operate as other types of shapes.

Figure 9:
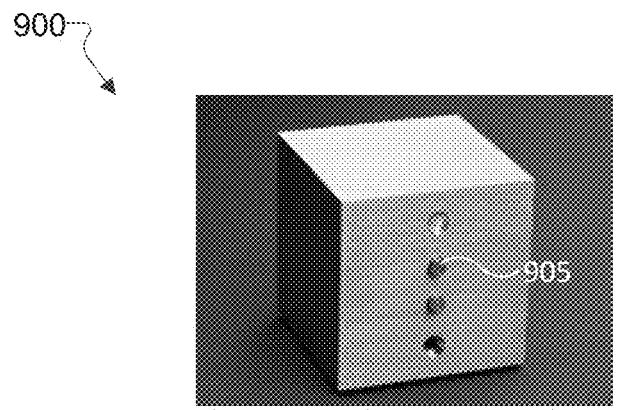
FIG. 9 illustrates an example of a specialized marker object according to an embodiment of the present disclosure.

FIG. 9 illustrates an example specialized marker object 900 according to an embodiment of this disclosure. The embodiment of the specialized marker object 900 shown in FIG. 9 is for illustration only. Other embodiments of the specialized marker object 900 may be used without departing from the scope of this disclosure.

An advanced or specialized marker object 900 contains physical controls 905, such as buttons, knobs, sliders, etc. The physical controls 905 can be used as inputs for the marker object 300 to interact with the AR device 320. The advanced or specialized marker object 900 also includes displays or touch sensors that interact with the AR device 320. For example, when the headset is removed, the advanced or specialized marker object 900 may display what was being overlaid on the display of the specialized marker object 900.

Although FIG. 9 illustrates one example of specialized marker object 900, various changes may be made to FIG. 9. For example, various components in FIG. 9 may be combined, further subdivided, or omitted and additional components may be added according to particular needs. As a particular example, while FIG. 9 illustrates the specialized marker object 900 configured as an object with inputs, specialized marker objects may be configured to operate as other types of shapes or with different type of inputs.

Figure 10:
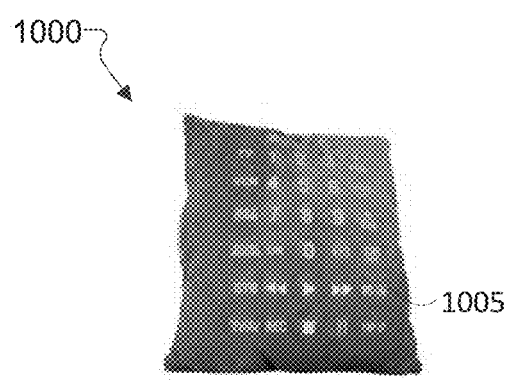
FIG. 10 illustrates an example of a dumb marker object according to an embodiment of the present disclosure.

FIG. 10 illustrates an example dumb marker object 1000 according to an embodiment of this disclosure. The embodiment of the dumb marker object 1000 shown in FIG. 10 is for illustration only. Other embodiments of the dumb marker object 1000 may be used without departing from the scope of this disclosure.

A dumb marker object 1000 may be created using any physical object 310. After indicating a physical object 310 is a dumb marker object 1000, the AR device 320 may track and use the dumb marker object 1000. For example, controls 1005 may be display on a cushion and a gesture at a specific control 1005 is recognized at the AR device 320. The control 1005 is then analyzed and the function is performed.

Although FIG. 10 illustrates one example of dumb marker object 1000, various changes may be made to FIG. 10. For example, various components in FIG. 10 may be combined, further subdivided, or omitted and additional components may be added according to particular needs. As a particular example, while FIG. 10 illustrates the dumb marker object 1000 configured as a pillow, dumb marker objects may be configured to operate as other types of objects or products without the ability to communicate with the electronic device 200.

Figure 11:
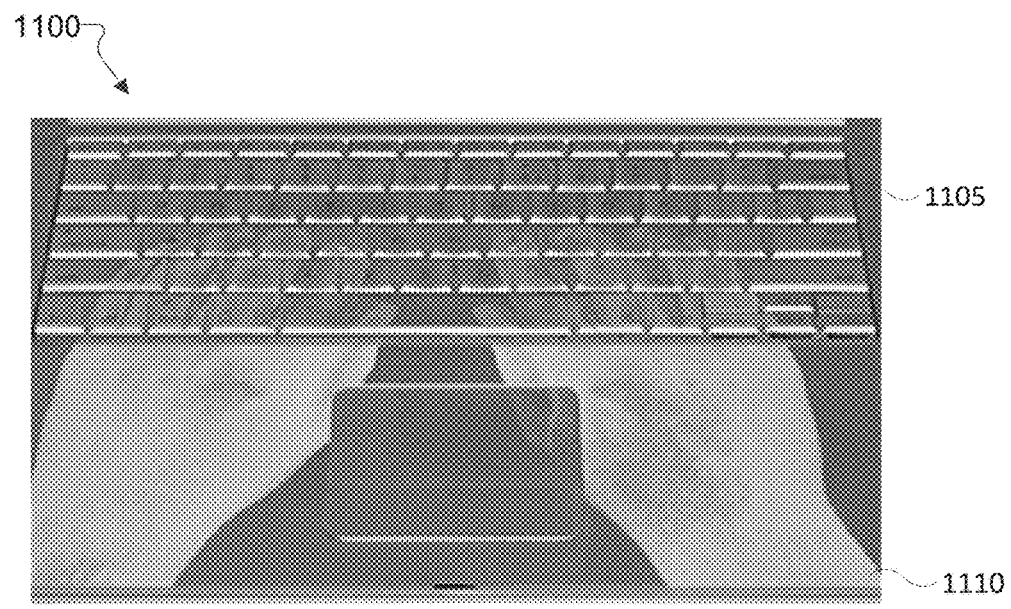
FIG. 11 illustrates an example of occlusion correction in an AR environment according to an embodiment of the present disclosure.
Figure 12:
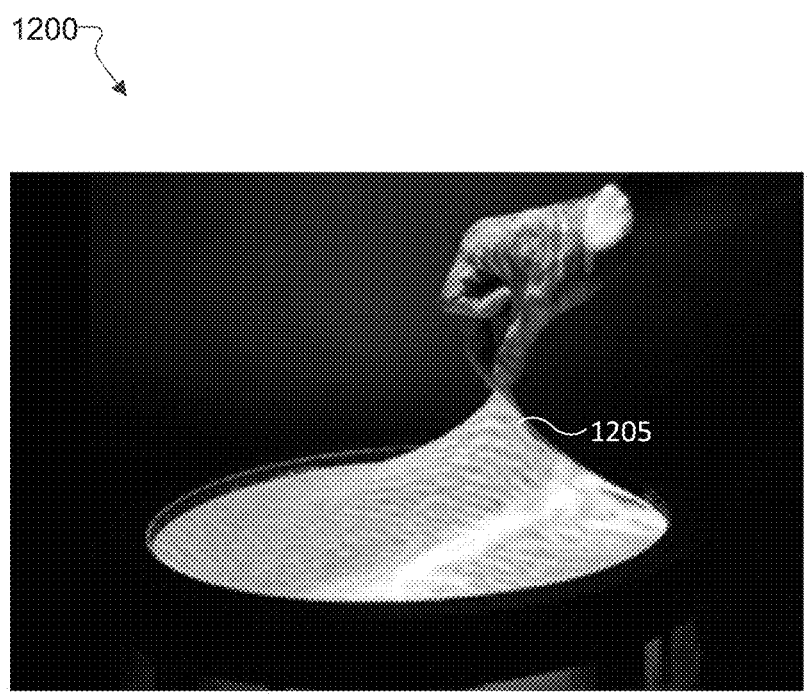
FIG. 12 illustrates an example of AR manipulation of objects according to an embodiment of the present disclosure.

FIGS. 11 and 12 illustrate embodiments of the AR environment 305 create an appearance of the manipulation of physical objects. The AR environment 305 allows for creation of virtual items on physical components or to give control of virtual items using physical components. The AR environment 305 also provides the ability to manipulate physical objects in non-typical manners, such as occlusion correction, putting a hand in a virtual object or virtually manipulating a physical object.

FIG. 11 illustrates an example occlusion correction 1100 in an AR environment according to an embodiment of this disclosure. The embodiment of the occlusion correction 1100 shown in FIG. 11 is for illustration only. Other embodiments of the occlusion correction 1100 may be used without departing from the scope of this disclosure.

In certain circumstances, interacting with marker objects 300 requires viewing the overlay 315 while also obstructing the overlay 315. For example, the overlay 315 is a virtual keyboard 1105. When the user moves its hands 1110 into typing position on the keyboard, the hands may normally block a number of keys. This may not be an issue with a physical keyboard, because the user may feel the keys and adjust the hands accordingly. But locating fingers on keys is much more difficult. Performing occlusion correction on the hands 1110 may allow the keyboard to be viewed clear from obstructions. Occlusion correction occurs by the reconfiguring the portions of the overlay, which are being obstructed by the hands 1110 or other object, to be displayed un-warped and un-distorted on the hands 1110 or other objects in a manner that the overlay appears to remain on the marker object 300.

AR manipulation 1200 allows a user to interact with virtual objects and physical objects in a manner not previously possible. In some embodiments, users have the ability to overlay a virtual object over their hands. For example, the AR device 320 can use an overlay 315 to provide the experience of wearing boxing gloves in a video game. The AR device 320 can also allow users to interact with the marker object 300 inside a virtual object.

Although FIG. 11 illustrates one example of occlusion correction 1100, various changes may be made to FIG. 11. For example, various components in FIG. 11 may be combined, further subdivided, or omitted and additional components may be added according to particular needs. As a particular example, while FIG. 11 illustrates the occlusion correction 1100 configured as an x-ray for a keyboard, occlusion correct may be configured to apply to any type of overlay that an object is placed in front of.

FIG. 12 illustrates an example AR manipulation 1200 of objects according to an embodiment of this disclosure. The embodiment of the AR manipulation 1200 shown in FIG. 12 is for illustration only. Other embodiments of the AR manipulation 1200 may be used without departing from the scope of this disclosure.

In some embodiments, the AR device 320 allows virtual manipulation 1205 of a physical object. A surface overlay 405 of a marker object 300 can be treated a rubber or plastic material. The surface overlay 405 can be stretched, crumpled, knotted, etc. In some embodiments, the AR device 320 can allow virtual manipulation 1205 of items worn, appearing to change the colors when suitable.

Although FIG. 12 illustrates one example of AR manipulation 1200, various changes may be made to FIG. 12. For example, various components in FIG. 12 may be combined, further subdivided, or omitted and additional components may be added according to particular needs. As a particular example, while FIG. 12 illustrates the AR manipulation 1200 configured as a pulling a surface of marker object, AR manipulation may be configured to manipulate a marker object in any transformative manner.

Figure 13:
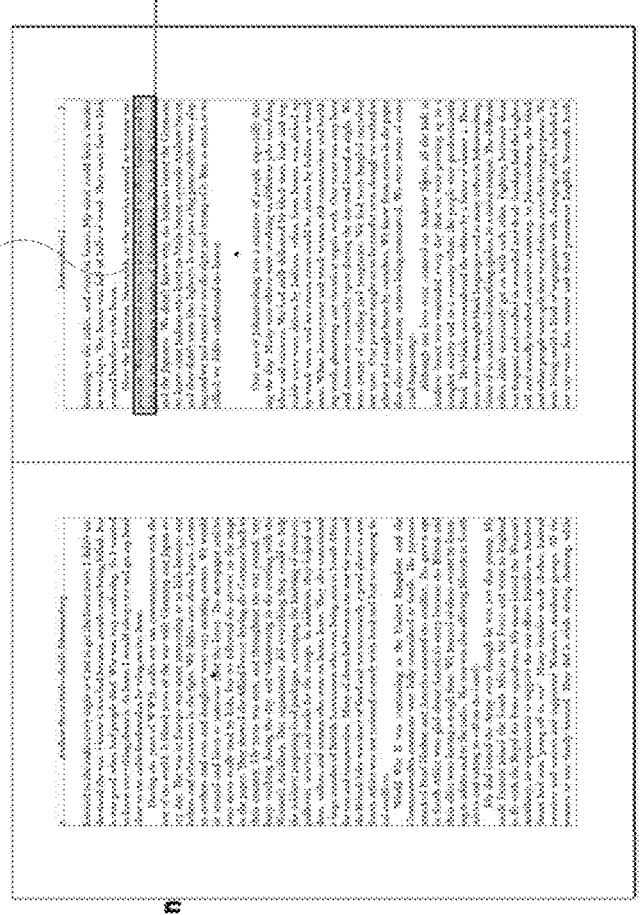
FIG. 13 illustrates an example of gaze detection in an AR environment according to an embodiment of the present disclosure.

FIG. 13 illustrates an example gaze detection 1300 according to an embodiment of this disclosure. The embodiment of the gaze detection 1300 shown in FIG. 13 is for illustration only. Other embodiments of the gaze detection 1300 may be used without departing from the scope of this disclosure.

In some embodiments, the AR device 320 may include cameras or other sensors to track the user's eyes to determine the user's gaze point or field of view by triangulating a user's gaze focus 1305 in VR or AR space. This may allow the AR device 320 to accurately track the exact textual or image content the user is consuming at any point in time. Based on an analysis of the content that is being read, the headset (either AR or VR) can display additional information 1310 in the area surrounding the marker object or blank device that correlates to content or other various statistics. The display of additional information 1310 as exemplified below can enhance multitasking in the VR or AR space while a user is reading. It can display various applications (SMS/email/etc.) around the book so the user does not need to leave reading entirely to check notifications.

Gaze tracking with OCR or artificial intelligence (AI) allows the AR device to read all the text or some of the text for the user as suitable. For example, the OCR with gaze detection 1300 may allow the AR device 320 to use different voices for different book characters. The AI could instantly recognize the content being consumed and automatically associate the location of the gaze in the content with the corresponding machine readable data. The AR device 320 with gaze detection 1300 may gather statics on what words or sentences a user has spent longer on or looked for help with. The AR device 320 with gaze detecting 1300 provides auto enlargement of the current sentence being read, reverting back to normal text size once the reader had moved their eyes onto the next sentence. (e.g., Text magnification at the point of gaze). The current word/sentence text color may be changed to aid the user in keeping track of where they are in the page. The user can have the system pronounce the current word for them. If the system through OCR/AI recognized that a certain place is being repeatedly mentioned it can pull up additional information on a separate display related to that location or change the background to that location. For example, if the AR device 320 finds four references to London in a given page, the system may change the VR background to a scene of London. The AR device 320 may present additional content 1310 (e.g., facts/ images about a location, definitions, etc.) in areas surrounding the VR/AR book based on the content currently focused on by the user. The AR device 320 may automatically turn a page or scroll text when the gaze of the user reaches the end of a given text page. The AR device 320 can easily provide information on what a user reads and any words they found problematic.

The AR device 320 can decide which content to provide additional information on based on user eye pauses while reading content (e.g., more complex words) allowing for overlaying data like phonetic spelling immediately or upon a user's gesture/voice command. The AR device 320 may also calculate a word's complexity score based on length, combination of characters, number of syllables, and kind of words the user has previously paused on. Users can set preferences for what the system should provide contextual information on including:

World definitions for infrequently found complex words;

Images/maps and information for countries, cities, streets, etc.;

Providing short biographies and/or images for historical or famous figures;

Additional contextual information if a place and time are mentioned;

For example, if London January 1959 is found in the text, the major events that occurred in that location and period may be listed;

Advertising of products based on the content of the book can be show in the VR page;

For example a diamond ring is mentioned in the text therefore an clickable ad/image for a jewelry store is placed in the VR space;

The user may receive rewards with a coupon or book discount; and

Having additional display space around the book content allows for new user experiences. New user experience provided in the additional space include:

The book's content and the VR background may be coordinated;

For example when the book describes a roller coaster the background may animate with a roller coaster experience;

The roller coaster VR experience may be part of the books media supporting content;

Reading statics are more efficiently displayed to the user;

Advertising of products based on the content of the book is shown in the VR page;

Allows multiple apps access while reading, placing the apps around the reading content. For example, displaying SMS/text messages, incoming emails, updates or content from social media networks; and The system may leave a visual marker on the page when the user starting viewing other content so they can quickly find their spot when they return to the book.

Also, when the HMD detects the gaze focus on supplemental content, the content can be expanded, scrolled, or linked to provide additional information. For example, when a user gazes at the reading statistics, a graph, chart, or histogram is displayed illustrating how the statistics changed over the course of consuming the content.

Although FIG. 13 illustrates one example of gaze detection 1300, various changes may be made to FIG. 13. For example, various components in FIG. 13 may be combined, further subdivided, or omitted and additional components may be added according to particular needs. As a particular example, while FIG. 13 illustrates the daze detection 1300 configured as a reading a book, gaze detection may be configured to operate to identify any to of object of focus, in print or otherwise.

Figure 14:
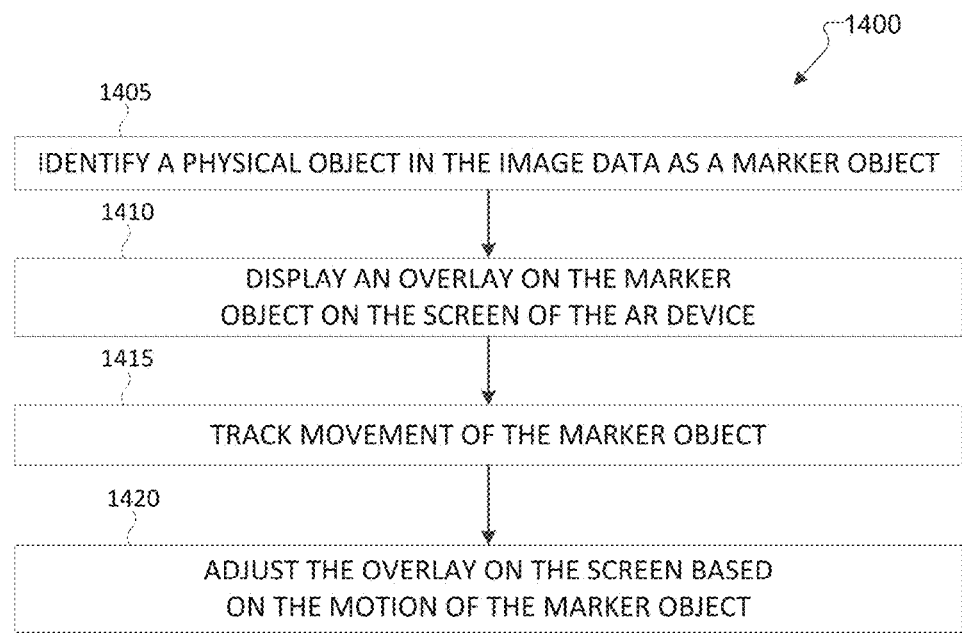
FIG. 14 illustrates an exemplary process for control of AR content to create a sensation that virtual objects are real according to an embodiment of the present disclosure

FIG. 14 illustrates an example process 1400 for control of AR content to create a sensation that virtual objects are real according to an embodiment of the present disclosure. For example, the process depicted in FIG. 14 may be performed by electronic device 200 in FIG. 2; the process may also be implemented by electronic devices 106-116 in FIG. 1.

In operation 1405, the AR device 320 identifies a physical object 310 in image data as a marker object 300. The marker object 300 can be selected based on user input or by programming. The marker object 300 can be an advanced marker object 900 or a dumb marker object 1000. The attributes of the marker object 300 are transmitted or detected in order for the AR device 320 to determine applications that are compatible with the marker object 300.

In operation 1410, the AR device 320 displays an overlay 315 on the marker object 300 on the display of the AR device 320. The overlay 315 includes AR content to appear as a skin on the marker object 300. The marker object 300 allows the user to interact and manipulate the AR content. The overlay 315 can include a variety of AR content including pictures, videos, applications, etc. The overlay 315 can be one type of AR content or different types of AR content for each surface overlay 405. The AR content on the overlay 315 can be static or dynamic.

In operation 1415, the AR device 320 tracks movement of the marker object 300. The AR device 320 can use any method for tracking the surfaces 335 of the marker object 300 in order to determine rotation or lateral movement. Examples of tracking include using computer vision, identifying markings on the object, identifying geometric attributes, structured light, time of flight to travel, etc. In certain embodiments, the marker objects 300 could include six degree of freedom sensors that communicate position changes to the AR device 320. In other embodiments, a third party tracker could be used to track the marker object 300 in relation to the AR device 320 While tracking the movement of the marker object 300, the AR device also monitors for inputs and gestures.

In operation 1420, the AR device 320 adjusts the overlay 315 on the display based on the motion of the marker object 300. Rotating the marker object 300 causes the AR content on the overlay 315 to rotate or cycle. When a surface disappears from the AR environment 305, new AR content is displayed on a new surface.

When multiple marker objects are displayed in the AR environment 305, the motion of a marker object 300 performs a function on a second marker object 300. For example, moving two marker objects 300 in the same vicinity binds them together for a combined overlay 315.

Although FIG. 14 illustrates an example process 1400 for virtual objects made real in an AR environment, various changes may be made to FIG. 14. For example, while shown as a series of steps, various steps may overlap, occur in parallel, occur in a different order, occur multiple times, or not be performed in certain embodiments.

Figure 15:
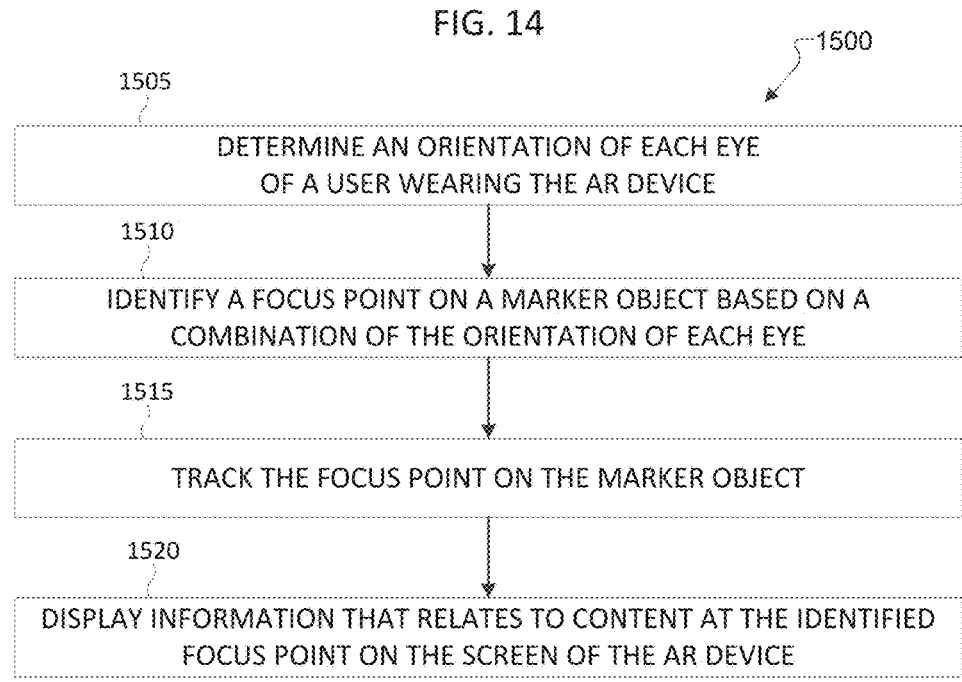
FIG. 15 illustrates an exemplary process for gaze detection according to an embodiment of the present disclosure.

FIG. 15 illustrates an example process 1500 for gaze detection according to this disclosure. For example, the process depicted in FIG. 15 may be performed by electronic device 200 in FIG. 2; the process may also be implemented by electronic devices 106-116 in FIG. 1.

In operation 1505, the AR device 320 determines an orientation of each eye of a user wearing the AR device 320. The AR device 320 includes camera sensors facing towards and away from the user. The camera sensors facing the user monitor an orientation of each eye for use in triangulating a focus point 1305.

In operation 1510, the AR device 320 identifies a focus point on a marker object based on a combination of the orientation of each eye. The AR device 320 triangulates the focus point using the orientation of each eye and the distance to AR content. Once the focus point is determined, the AR device 320 can use OCR or another method to determine the AR content that is being viewed. Based on the content and the focus point, the AR device provides additional information or supplemental information.

In operation 1515, the AR device 320 tracks the focus point on the marker object. As the user consumes the AR content, the AR device 320 monitors the focus point to determine usage of the AR content. The gaze of the user is analyzed based on the time at a specific focus point or the speed at which the focus point moves. As the orientation of the eyes changes, the focus point moves.

In operation 1520, the AR device 320 displays the information that relates to content at the identified focus point on the display of the AR device 320. For example, when a user gazes at a specific word for an extended period of time, the AR device 320 determines that the word is difficult and displays a definition of a word. When the AR content being consumed contains repetitive words, the AR device 320 provides additional information 1310 on the subject matter of the repetitive words. For example, when reading a story that mention London multiple times, the AR device 320 displays additional information about the city of London or displays an image of the city of London as a background of the AR environment 305.

The information can also relate to statistics of the user. For example, the AR device can determine how many words per minute or total pages the user has read. The gaze detection can also monitor which words are given a user the most difficulty.

Although FIG. 15 illustrates an example process 1500 for gaze detection, respectively, various changes may be made to FIG. 15. For example, while shown as a series of steps, various steps may overlap, occur in parallel, occur in a different order, occur multiple times, or not be performed in certain embodiments.

Figure 16:
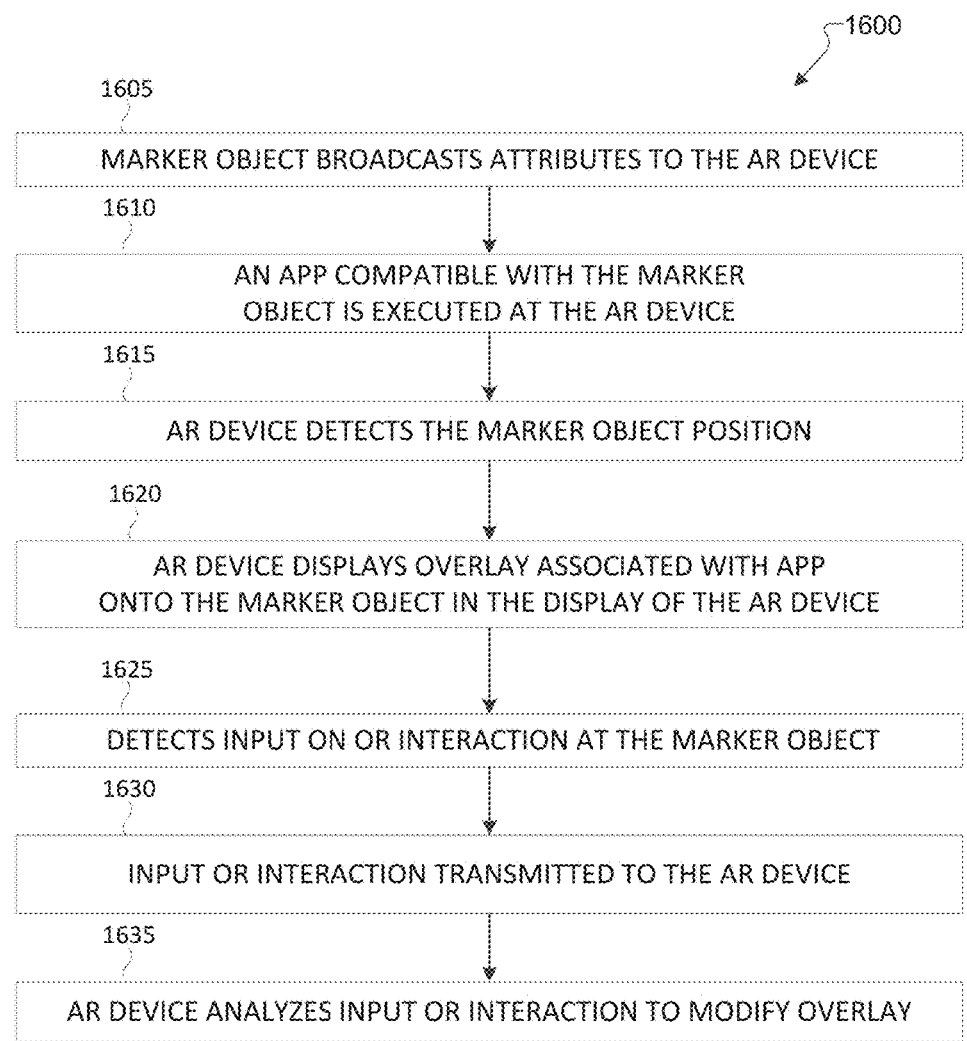
FIG. 16 illustrates an exemplary process for interaction of a marker object with the electronic device according to an embodiment of the present disclosure.

FIG. 16 illustrates an exemplary process 1600 for an AR device interacting with an advanced marker object 900 with the electronic device according to an embodiment of the present disclosure. For example, the process depicted in FIG. 16 may be performed by electronic device 200 in FIG. 2; the process may also be implemented by electronic devices 106-116 in FIG. 1.

In operation 1605, the marker object 300 broadcast attributes to the AR device 320. The attributes of the marker object 300 includes physical dimensions, sensors, outputs, wireless connectivity, etc.

In operation 1610, the AR device 320 determines and executes an application compatible with the marker object 300. The application can be packaged with a specific marker object 300, in a manner that the marker object 300 connecting to the AR device 320 automatically launches a specific application. In other embodiments, the AR device 320 can determine compatible applications from the attributes. When a plurality of compatible apps is available, the AR device 320 can display a list of the compatible apps on the display 325 or on one of the surface overlays 405. The marker object 300 can be used to select the compatible application.

In operation 1615, the AR device 320 detects the marker object 300 position. The AR device 320 can use any tracking method to determine the motion of the marker object 300. For example, the AR device 320 can use detected vertices and edges on the marker object 300 to determine motion.

In operation 1620, the AR device 320 displays an overlay 315 associated with the application onto the marker object 300 in the display 325 of the AR device 320. Detecting the motion of the marker object 300 allows for the overlay to constantly appear to be a "skin" of the physical object 310.

In operation 1625, the marker object 300 detects an input or an interaction. The marker object 300 can detect an input or motion on one of the sensors or switches on the physical device 310 of the marker object 300. For example, a gyroscope or accelerometer installed in the marker object 300 may determine rotation or lateral movements, a touch sensor may detect a physical touch, etc. In some embodiments, the AR device 320 may detect the input or motion, separately or in combination with the marker object 300.

In operation 1630, the marker object 300 transmits the input or interaction to the AR device 320. The marker object 300 may use the communication unit 210 to transmit the detected input or motion of the marker object 300. The transmission used can be any wireless connection method including, for example, Wi-Fi direct, BLUETOOTH, NFC, etc.

In operation 1635, the AR device 320 analyzes input or interaction detected at the marker object 300. The AR device uses the input or motion to determine a suitable function corresponding to the marker object 300.

Although FIG. 16 illustrates an example process 1600 for interaction of a marker object with the electronic device, respectively, various changes may be made to FIG. 16. For example, while shown as a series of steps, various steps may overlap, occur in parallel, occur in a different order, occur multiple times, or not be performed in certain embodiments.

Figure 17:
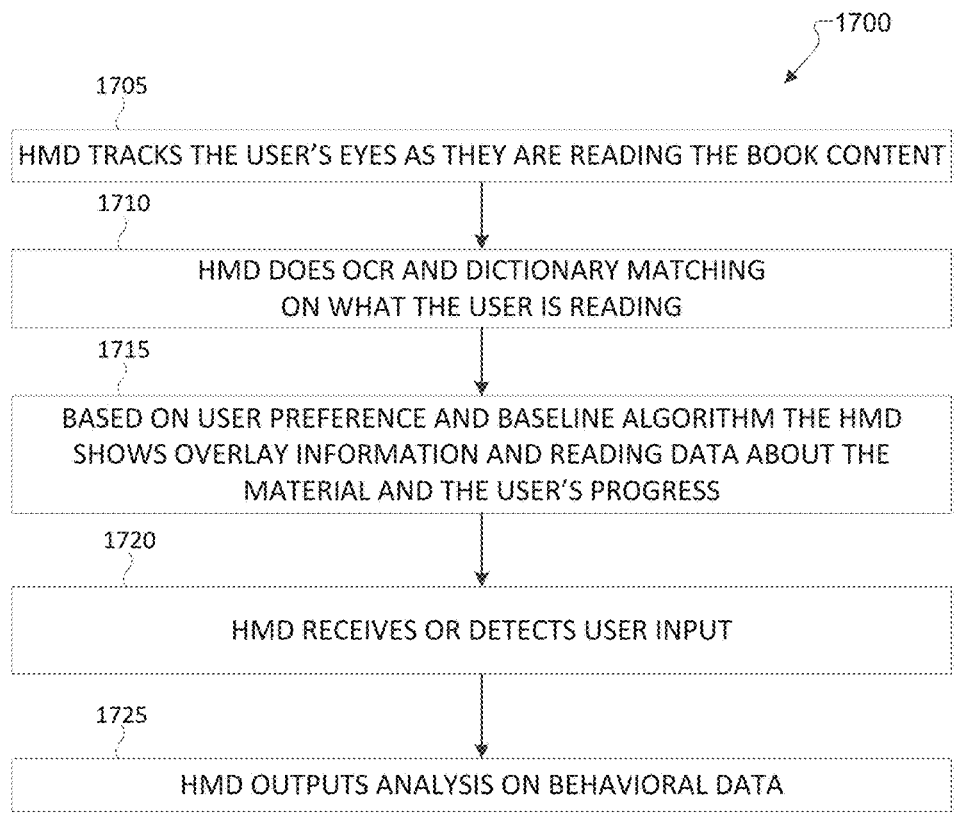
FIG. 17 illustrates an exemplary process for providing additional information according to a focus point of a tracked gaze according to an embodiment of the present disclosure.

FIG. 17 illustrates an example process 1700 for providing additional information according to a focus point of a tracked gaze according to this disclosure. For example, the process depicted in FIG. 17 may be performed by electronic device 200 in FIG. 2; the process may also be implemented by electronic devices 106-116 in FIG. 1.

In operation 1705, the HMD can be configured for tracking the focus of a user's gaze during content consumption. The HMD determines an orientation of each eye of a user wearing the HMD. The HMD may include one or more camera sensors which may be internal (focused on a user) or external (focused on the surrounding environment). The internal camera sensors may monitor an orientation of each eye for use in triangulating a focus point 1305. The identification of a focus point on a marker object can be based on a combination of the orientation of each eye. The triangulation of the focus point can be performed utilizing the orientation of each eye and the distance to AR content. Once the focus point is determined, the HMD can use OCR or another method to determine the AR content that is being viewed. Based on the content and the focus point, the HMD provides additional information or supplemental information. As the user consumes the AR content, the HMD monitors the focus point to determine usage of the AR content. The gaze of the user is analyzed based on the time at a specific focus point or the speed at which the focus point moves. As the orientation of the eyes changes, the focus point moves.

In operation 1710, the HMD is configured for performing optical character recognition (OCR) and dictionary matching on the content the user is consuming. The HMD may be configured to calculate statistics based on the user's gaze. When the gaze lingers on content, the HMD may utilize the information to determine whether the content has a greater value or interest for the user or whether the content is more difficult compared to when the user's gaze skims or rapidly passes over content.

In operation 1715, the HMD is further configured for displaying overlay information and reading data about the content and the progress based on user preferences and a baseline algorithm of the system. The overlay information can be additional information that the HMD determines is of importance to the user based on the gaze, such as when the user's gaze lingers on content or repeatedly reviews content. The reading data can provide such analysis as rate of consumption, difficulty with words, etc. The HMD displays the additional information that relates to content at the identified focus point on the display of the HMD. For example, when a user gazes at a specific word for an extended period of time, the HMD may determine that the word is difficult and displays a definition of a word. When the AR content being consumed contains repetitive words, the HMD provides additional information 1310 on the subject matter of the repeated word or words. For example, when reading a story that mention Johannesburg multiple times, the HMD displays additional information about the city of Johannesburg or displays an image of the city of Johannesburg as a background of the AR environment 305.

In operation 1720, the HMD is further configured for receiving or detecting a user input. When presented with additional information, the user can decide that more information is suitable, the information is irrelevant, etc. When statistics are presented, the user input can change the units or scroll through the statistics. For example, the HMD might display the rate of consumption in words per minute, but the user can request displaying words per hour, week, month, etc.

In operation 1725, the HMD is further configured for analyzing behavioral data collected to understand areas for improvement of the content presented or recommendations for the user. For example, the HMD can recognize that content is consumed differently at the right side of the display and create variable font size content to ease the reading for the user. The behavioral data can also be analyzed over multiple encounters to determine an optimal brightness of the display for different situations, such as indoor/outdoor, day/night, etc.

Although FIG. 17 illustrates an example process 1700 for providing additional information according to a focus point of a tracked gaze, respectively, various changes may be made to FIG. 17. For example, while shown as a series of steps, various steps may overlap, occur in parallel, occur in a different order, occur multiple times, or not be performed in certain embodiments.

Figure 18:
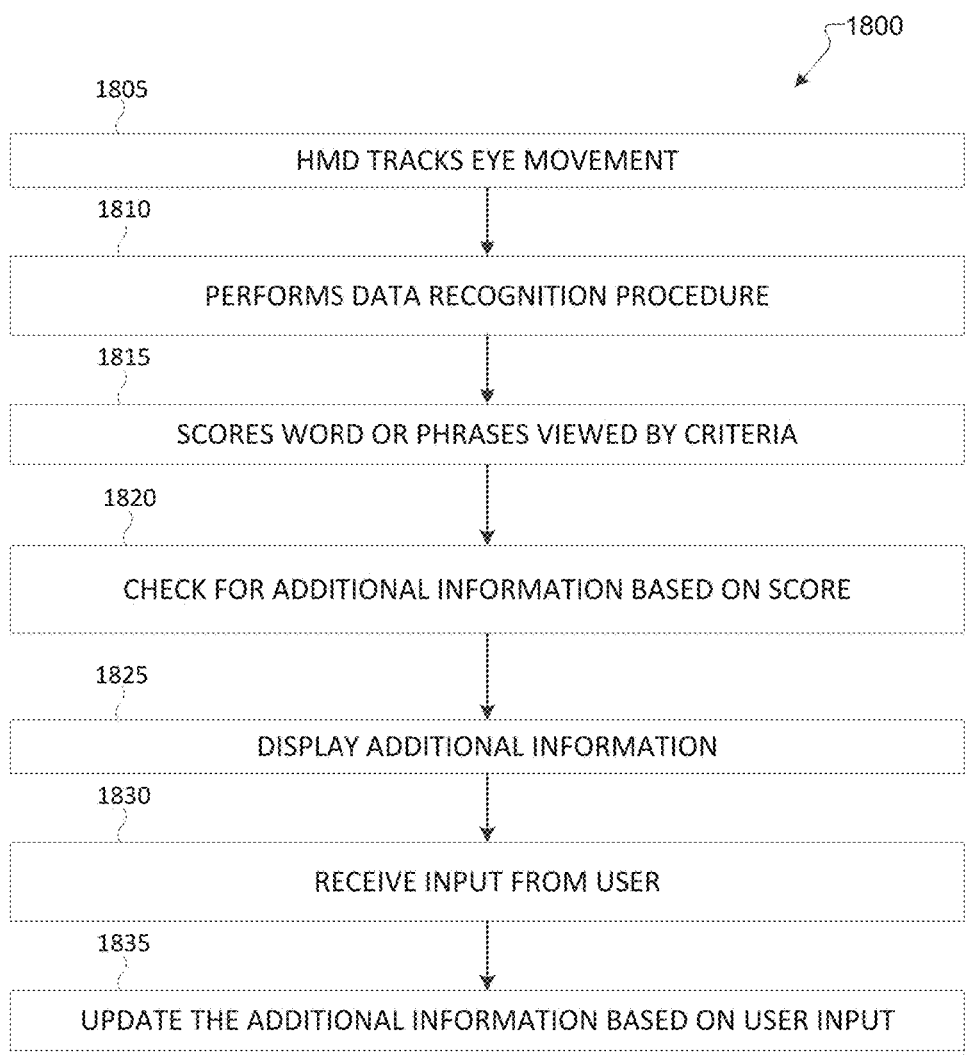
FIG. 18 illustrates an exemplary process for gaze tracking and surfacing supplemental contextual content according to an embodiment of the present disclosure.

FIG. 18 illustrates an example process 1800 for gaze tracking and surfacing supplemental contextual content according to this disclosure. For example, the process depicted in FIG. 18 may be performed by electronic device 200 in FIG. 2; the process may also be implemented by electronic devices 106-116 in FIG. 1.

In operation 1805, the HMD is configured for tracking the user's eye movement. The HMD determines an orientation of each eye of a user wearing the HMD. The HMD includes camera sensors facing towards and away from the user. The camera sensors facing the user monitor an orientation of each eye for use in triangulating a focus point 1305. The HMD identifies a focus point on a marker object based on a combination of the orientation of each eye. The HMD triangulates the focus point using the orientation of each eye and the distance to AR content. Once the focus point is determined, the HMD can use OCR or another method to determine the AR content that is being viewed. Based on the content and the focus point, the HMD provides additional information or supplemental information. The HMD tracks the focus point on the marker object. As the user consumes the AR content, the HMD monitors the focus point to determine usage of the AR content. The gaze of the user is analyzed based on the time at a specific focus point or the speed at which the focus point moves. As the orientation of the eyes changes, the focus point moves.

In operation 1810, the HMD is further configured for performing a data recognition procedure, such as optical character recognition (OCR) and dictionary matching, on the content the user is reading. The data recognition allows the HMD to recognize words and phrases in the content that the user is consuming.

In operation 1815, the HMD is further configured for scoring words or phrases viewed by criteria. The HMD calculates statistics based on the user's gaze while consuming the content. When the gaze lingers on content, the HMD determines if the content has a greater value or is more difficult than when the gaze skims over content. The criteria may include, for example, the length of time a user gazed at a specific word or phrase; the complexity of the word or phrase; whether the word or phrase is a person, place or thing; the frequency of a word or phrase appearing in the content; does the word or phrase match user criteria for providing additional info; etc.

In operation 1820, the HMD is further configured for checking for additional information based on the score. The higher a score of a word or phrase indicates a greater amount of additional information is suitable. A threshold for relevance can be set to create a minimum level of importance of the word or phrase for providing additional information.

In operation 1825, the HMD is further configured for displaying the additional information that relates to content at the identified focus point on the display of the HMD. The additional information is displayed in a manner that does not hinder the consumption of the original content.

In operation 1830, the HMD is further configured for receiving or detecting an input from a user. When presented with additional information, the user can decide that more information is suitable, the information is irrelevant, etc.

In operation 1835, the HMD is further configured for updating the additional information based on the user input. For example, when more additional information is requested by the user, the HMD can scroll or present more additional information related to original additional information presented to the user.

Although FIG. 18 illustrates an example process 1800 for gaze tracking and surfacing supplemental contextual content, respectively, various changes may be made to FIG. 18. For example, while shown as a series of steps, various steps may overlap, occur in parallel, occur in a different order, occur multiple times, or not be performed in certain embodiments. The steps may be performed by a separate device (e.g. a server, mobile device, desktop, laptop, etc.) in communication with the HMD.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A head mounted device (HMD) comprising:
   a camera configured to capture image data;
   a display;
   a memory; and
   a processor coupled to the memory, the display, and the camera, the processor configured to:
      identify a physical object in the image data as a marker object by detecting a set of attributes broadcast by the physical object;
      determine virtual content based on the set of attributes;
      display an overlay with the virtual content on the marker object on the display of the HMD to appear as a skin of the physical object;
      track a motion of the marker object; and
      adjust the overlay on the display based on the motion of the marker object.

2. The HMD of claim 1, wherein the
   virtual content includes virtual icons and virtual apps providing access to controls and applications in a virtual environment.

3. The HMD of claim 1, wherein the processor is further configured to:
- detect a gesture in relation to the marker object or a motion of the marker object; and
- perform a function corresponding to the gesture or motion.

4. The HMD of claim 3, wherein the processor is further configured to perform the function on a second marker object when the gesture or motion of the marker object is in relation to the second marker object.

5. The HMD of claim 1, wherein the processor is further configured to bond the marker object to a second marker object to create a combined marker object when the second marker object is in physical proximity to the marker object.

6. The HMD of claim 1, further comprising a transceiver to transmit and receive signals; and
- wherein the processor is further configured to:
  - receive an input detected by a sensor of the marker object when the marker object is not present in the image data captured by the camera; and
  - perform a function corresponding to the received input.

7. The HMD of claim 1, wherein the processor is further configured to:
- detect a second physical object in the image data;
- perform occlusion correction on parts of the overlay covering the second physical object in a manner that the overlay appears to display on the marker object through the second physical object.

8. The HMD of claim 1, further comprising a transceiver to transmit or receive a signal; and
- wherein the processor is further configured to:
  - detect a second marker object corresponding to another HMD in the image data; and
  - receive information indicating a second overlay relating to the second marker object; and
  - display the second overlay on the display of the HMD that overlays on the second marker object.

9. A method for managing a head mounted device (HMD), the method comprising:
- identifying a physical object in image data as a marker object by detecting a set of attributes broadcast by the physical object;
- determining virtual content based on the set of attributes;
- displaying an overlay with the virtual content on the marker object on a display of the HMD to appear as a skin of the physical object;
- tracking a motion of the marker object; and
- adjusting the overlay on the display based on the motion of the marker object.

10. The method of claim 9, wherein
the virtual content includes virtual icons and virtual apps providing access to controls and applications in a virtual environment.

11. The method of claim 9, further comprising:
- detecting a gesture in relation to the marker object or a motion of the marker object; and
- performing a function corresponding to the gesture or motion.

12. The method of claim 11, further comprising performing the function on a second marker object when the gesture or motion of the marker object is in relation to the second marker object.

13. The method of claim 9, further comprising bonding the marker object to a second marker object to create a combined marker object when the second marker object is in physical proximity to the marker object.

14. The method of claim 9, further comprising:
- receiving an input detected by a sensor of the marker object when the marker object is not present in the image data captured by a camera; and
- performing a function corresponding to the received input.

15. The method of claim 9, further comprising:
- detecting a second physical object in the image data;
- performing occlusion correction on parts of the overlay covering the second physical object in a manner that the overlay appears to display on the marker object through the second physical object.

16. The method of claim 9, further comprises:
- detecting a second marker object corresponding to another HMD in the image data; and
- receiving information indicating a second overlay relating to the second marker object; and
- displaying the second overlay on the display of the HMD that overlays on the second marker object.

17. A non-transitory computer readable medium embodying a computer program, the computer program comprising computer readable program code that when executed causes at least one processor to:
- identify a physical object in image data as a marker object by detecting a set of attributes broadcast by the physical object;
- determine virtual content based on the set of attributes;
- display an overlay with the virtual content on the marker object on a display of an HMD to appear as a skin of the physical object;
- track a motion of the marker object; and
- adjust the overlay on the display based on the motion of the marker object.

18. The non-transitory computer readable medium of claim 17, wherein the
virtual content includes virtual icons and virtual apps providing access to controls and applications in a virtual environment.

19. The non-transitory computer readable medium of claim 17, wherein the computer readable program code that when executed further causes at least one processor to:
- detect a gesture in relation to the marker object or a motion of the marker object; and
- perform a function corresponding to the gesture or motion.

20. The non-transitory computer readable medium of claim 19, wherein the computer readable program code that when executed further causes at least one processor to perform the function on a second marker object when the gesture or motion of the marker object is in relation to the second marker object.

21. The non-transitory computer readable medium of claim 17, wherein the computer readable program code that when executed further causes at least one processor to bond the marker object to a second marker object to create a combined marker object when the second marker object is in physical proximity to the marker object.

22. The non-transitory computer readable medium of claim 17, wherein the computer readable program code that when executed further causes at least one processor to:
- receive an input detected by a sensor of the marker object when the marker object is not present in the image data captured by a camera; and
- perform a function corresponding to the received input.

23. The non-transitory computer readable medium of claim 17, wherein the computer readable program code that when executed further causes at least one processor to:

detect a second physical object in the image data;

perform occlusion correction on parts of the overlay covering the second physical object in a manner that the overlay appears to display on the marker object through the second physical object.

24. The non-transitory computer readable medium of claim 17, wherein the computer readable program code that when executed further causes at least one processor to:

detect a second marker object corresponding to another HMD in the image data; and receive information indicating a second overlay relating to the second marker object; and display the second overlay on the display of the HMD that overlays on the second marker object.

25. A head mounted device (HMD) comprising:

a plurality of cameras including at least one camera to capture image data;

a display;

a memory; and a processor operably connected to the memory, the display, and the cameras, the processor configured to:

determine an orientation of each eye of a user wearing the HMD;

identify a focus point on a marker object based on a combination of the orientation of each eye;

track the focus point on the marker object; and display information that relates to content at the identified focus point on the display of the HMD.

26. The HMD of claim 25, wherein the processor is further configured to gather statistics based on the content monitored as the focus point moves.

27. The HMD of claim 25, wherein the processor is further configured to determine whether to provide the information based a pause in movement of the focus point.

28. The HMD of claim 25, wherein the processor is further configured to:

identify a physical object in the image data as a marker object;

track the marker object in three dimensional (3D) space;

display an overlay on the marker object on the display of the HMD; and continue to display the overlay on the marker object as a location of the marker object changes in the image data.

29. The HMD of claim 28, wherein the processor is further configured to:

detect the focus point at an end of the content; and display new content on the display of the HMD that overlays on the marker object.

30. The HMD of claim 28, wherein the processor is further configured to:

detect a gesture in relation to the marker object or a motion of the marker object; and display new content on the display of the HMD that overlays on the marker object.

\* \* \* \* \*